United States Patent
Kataoka et al.

(10) Patent No.: US 9,329,357 B2
(45) Date of Patent: May 3, 2016

(54) IMAGING UNIT, MANUFACTURING METHOD THEREOF, AND LIQUID EJECTING APPARATUS

(71) Applicant: SEIKO EPSON CORPORATION, Tokyo (JP)

(72) Inventors: Hideyuki Kataoka, Shiojiri (JP); Mitsutaka Ide, Shiojiri (JP); Hiroyuki Kobayashi, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/668,447

(22) Filed: Mar. 25, 2015

(65) Prior Publication Data

US 2015/0273898 A1 Oct. 1, 2015

(30) Foreign Application Priority Data

Mar. 27, 2014 (JP) .................................. 2014-067091
Feb. 23, 2015 (JP) .................................. 2015-033232

(51) Int. Cl.
| | |
|---|---|
| *B41J 29/38* | (2006.01) |
| *G02B 7/02* | (2006.01) |
| *B41J 11/00* | (2006.01) |
| *G11B 7/00* | (2006.01) |
| *G11B 7/0037* | (2006.01) |
| *B41J 2/45* | (2006.01) |

(52) U.S. Cl.
CPC ............. *G02B 7/025* (2013.01); *B41J 11/0095* (2013.01); *G02B 7/022* (2013.01); *B41J 2/451* (2013.01); *G11B 7/00* (2013.01); *G11B 7/0037* (2013.01)

(58) Field of Classification Search
None
See application file for complete search history.

(56) References Cited

U.S. PATENT DOCUMENTS

| | | | |
|---|---|---|---|
| 8,864,271 B2 | 10/2014 | Abe | |
| 2013/0141487 A1* | 6/2013 | Abe | ......................... B41J 11/00 347/16 |
| 2014/0003062 A1 | 1/2014 | Yoshimura et al. | |

FOREIGN PATENT DOCUMENTS

| | | |
|---|---|---|
| JP | 2013-119439 | 6/2013 |
| JP | 2014-006476 | 1/2014 |

\* cited by examiner

*Primary Examiner* — Lisa M Solomon
(74) *Attorney, Agent, or Firm* — Workman Nydegger

(57) ABSTRACT

An imaging unit is provided with a cylindrical lens barrel, and an object-side lens which is disposed in the lens barrel and is fixed to the lens barrel using an adhesive. The lens barrel includes three abutting portions and three adhesive portions. The object-side lens abuts the three abutting portions in an optical axis direction of the object-side lens, and the adhesive portions are formed between an outer circumferential surface of the object-side lens and an inner circumferential surface of the lens barrel, and the adhesive is injected therein. The three adhesive portions are formed at an interval in a circumferential direction. The three adhesive portions and the three abutting portions do not overlap each other in plan view as seen from a vertical direction.

12 Claims, 10 Drawing Sheets

DOWNWARD ←→ UPWARD

IMAGING UNIT, MANUFACTURING METHOD THEREOF, AND LIQUID EJECTING APPARATUS

BACKGROUND

1. Technical Field

The present invention relates to an imaging unit, a manufacturing method thereof, and a liquid ejecting apparatus provided with the imaging unit.

2. Related Art

A liquid ejecting apparatus in which an imaging unit is provided on a supporting portion which supports a medium, a texture of the lower surface of the medium which passes over the medium supporting portion is imaged by the imaging unit, and the transport amount of the medium is detected based on the image that is obtained through the imaging is known as a liquid ejecting apparatus which ejects a liquid such as an ink from an ejecting unit onto a medium such as paper. In such a liquid ejecting apparatus, an opening portion for allowing light from the imaging unit to radiate toward the bottom surface of the medium is formed in the supporting surface of the medium supporting portion (for example, refer to JP-A-2013-119439).

As illustrated in FIG. 15A, an imaging unit 200 of the related art is provided with a cylindrical lens holder 210, which forms a portion of a lens barrel, and an optical member 220 (a lens), which is fixed to the lens holder 210 using an adhesive 230. The lens holder 210 includes an abutting portion 212 and a through hole 213. The abutting portion 212 protrudes inward from an inner circumferential surface 211 and the optical member 220 is abutted thereto, and the through hole 213 penetrates, in the radial direction of the lens holder 210, a portion that is adjacent to the abutting portion 212 in the axial direction of the lens holder 210. In the imaging unit 200 of the related art, the optical member 220 is fixed to the lens holder 210 by injecting the adhesive 230 into the through hole 213 in a state in which the optical member 220 is inserted into the lens holder 210 and abuts the abutting portion 212 (for example, refer to JP-A-2014-6476).

However, as illustrated in FIG. 15B, in the imaging unit 200 of the related art, the adhesive 230 which is injected into the through hole 213 enters a gap between an outer circumferential surface 221 of the optical member 220 and the inner circumferential surface 211 of the lens holder 210. Since the through hole 213 directly communicates with the gap between a top surface 212a of the abutting portion 212 and a bottom surface 222 of the optical member 220, there is a case in which the adhesive 230 enters the gap between the top surface 212a of the abutting portion 212 and the bottom surface 222 of the optical member 220. In this case, there is a concern that the optical member 220 will incline toward the lens holder 210 due to the adhesive 230 lifting the optical member 220 from the abutting portion 212.

SUMMARY

An advantage of some aspects of the invention is to provide an imaging unit capable of suppressing the inclination of the optical member toward the lens barrel, the manufacturing method thereof, and a liquid ejecting apparatus which is provided with the imaging unit.

Hereinafter, means of the invention and operation effects thereof will be described.

An imaging unit includes a cylindrical lens barrel, and an optical member which is disposed inside the lens barrel and is fixed to the lens barrel using an adhesive, in which the lens barrel includes a plurality of abutting portions which are orthogonal to a center axis of the lens barrel, are formed at an interval in an inner surface direction, which is a direction along an inside surface of the lens barrel, and which the optical member abuts in an optical axis direction of the optical member, in which a plurality of adhesive portions, into which the adhesive is injected, are provided between an outside surface of the optical member and an inside surface of the lens barrel facing the outside surface, in which the plurality of adhesive portions are provided at an interval in the inside surface direction, and in which the plurality of adhesive portions and the abutting portions are in a mutually non-overlapping dispositional relationship in plan view as seen from the optical axis direction.

In this case, the gap between the outside surface of the optical member and the inside surface of the lens barrel facing the outside surface and the gap between the abutting portions and the optical member assume positions distanced from each other due to the dispositional relationship in which the plurality of adhesive portions and the abutting portions do not overlap each other in plan view as seen from the optical axis direction. Accordingly, even if the adhesive of the plurality of adhesive portions enters the gap between the outside surface of the optical member and the inside surface of the lens barrel facing the outside surface, the adhesive does not easily enter the gaps between the abutting portions and the optical member. Therefore, the optical member lifting up in relation to the abutting portions and inclining in relation to the abutting portions due to the adhesive entering the gaps between the abutting portions and the optical member is suppressed.

In the imaging unit, it is preferable that the plurality of adhesive portions be provided so as to be disposed at an equal angle interval in the inside surface direction.

In the plurality of adhesive portions, a force of the contraction of the adhesive that accompanies the curing of the adhesive acts on the optical member. Therefore, when the plurality of adhesive portions are provided so as to be disposed at different intervals in the inside surface direction of the lens barrel, there is a concern that the force which acts on the optical member as the adhesive cures will be biased in plan view as seen from the optical axis direction. Therefore, there is a concern that the optical member will move in relation to the lens barrel as the adhesive cures.

To counter this, in the configuration described above, since the plurality of adhesive portions are provided to be disposed at an equal angle interval in the inside surface direction of the lens barrel, the force which acts on the optical member as the adhesive cures becoming biased in plan view as seen from the optical axis direction is suppressed. Therefore, the movement of the optical member in relation to the lens barrel as the adhesive cures is suppressed.

In the imaging unit, it is preferable that a plurality of protruding portions which protrude toward the outside surface of the optical member be formed on a portion in the inside surface of the lens barrel facing the outside surface of the optical member, that the plurality of protruding portions be formed at an interval in the inside surface direction, that the optical member be fitted on the plurality of protruding portions with a gap, and that the adhesive portions be formed by the adhesive being injected into gaps between the outside surface of the optical member and the protruding portions.

In this case, the position of the optical member in relation to the lens barrel in plan view as seen from the optical axis direction is determined by the optical member being fitted on the plurality of protruding portions with a gap. The position of the optical member in relation to the lens barrel in the optical axis direction and a direction orthogonal to the optical axis direction is determined due to the optical member abutting the abutting portion in this state. Therefore, it is possible to easily determine the position of the optical member in relation to the lens barrel.

In the imaging unit, it is preferable that the adhesive portions which are adjacent to the abutting portions in the inside surface direction be provided at an interval in the inside surface direction from the same abutting portions.

In this case, even if the adhesive enters the gap between the outside surface of the optical member and the inside surface of the lens barrel facing the outside surface, the adhesive that enters, enters portions between the abutting portions and the adhesive portions in the inside surface direction of the lens barrel. Therefore, the adhesive entering the gap between the abutting portions and the optical member is suppressed.

In the imaging unit, it is preferable that a sealing member be further provided in a position contacting the optical member inside the lens barrel to close a gap between the optical member and an inner circumference surface of the optical member.

In this case, in the lens barrel, the gap between the optical member and the inner circumference surface of the optical member is closed by the sealing member. Therefore, a possibility that foreign materials enter therein can be suppressed.

In the imaging unit, it is preferable that the sealing member be composed of an elastically deformable elastic member.

In this case, since the optical member and the inner circumference surface of the optical member can be tightly adhered by elastically deforming the sealing member, a possibility that foreign materials enter therein can be suppressed.

A liquid ejecting apparatus includes a transport unit which transports a medium, an ejecting unit which ejects a liquid onto the medium, an imaging unit which images the medium that is transported by the transport unit, and a control unit which controls an amount which the transport unit transports the medium based on an image that is imaged by the imaging unit, in which the imaging unit includes a cylindrical lens barrel, and an optical member which is disposed inside the lens barrel and is fixed to the lens barrel using an adhesive, in which the lens barrel includes a plurality of abutting portions which are orthogonal to a center axis of the lens barrel, are formed at an interval in an inside surface direction, which is a direction along an inside surface of the lens barrel, and which the optical member abuts in an optical axis direction of the optical member, in which a plurality of adhesive portions, into which the adhesive is injected, are provided between an outside surface of the optical member and an inside surface of the lens barrel facing the outside surface, in which the plurality of adhesive portions are provided at an interval in the inside surface direction, and in which the plurality of adhesive portions and the abutting portions are in a mutually non-overlapping dispositional relationship in plan view as seen from the optical axis direction.

In this case, the gap between the outside surface of the optical member and the inside surface of the lens barrel facing the outside surface and the gap between the abutting portions and the optical member assume positions distanced from each other due to the dispositional relationship in which the plurality of adhesive portions and the abutting portions do not overlap each other in plan view as seen from the optical axis direction. Accordingly, even if the adhesive of the plurality of adhesive portions enters the gap between the outside surface of the optical member and the inside surface of the lens barrel facing the outside surface, the adhesive does not easily enter the gaps between the abutting portions and the optical member. Therefore, the optical member lifting up in relation to the abutting portions and inclining in relation to the abutting portions due to the adhesive entering the gaps between the abutting portions and the optical member is suppressed.

In the liquid ejecting apparatus, it is preferable that the plurality of adhesive portions be provided so as to be disposed at an equal angle interval in the inside surface direction.

In the plurality of adhesive portions, a force of the contraction of the adhesive that accompanies the curing of the adhesive acts on the optical member. Therefore, when the plurality of adhesive portions are provided so as to be disposed at different intervals in the inside surface direction of the lens barrel, there is a concern that the force which acts on the optical member as the adhesive cures will be biased in plan view as seen from the optical axis direction. Therefore, there is a concern that the optical member will move in relation to the lens barrel as the adhesive cures.

To counter this, in the configuration described above, since the plurality of adhesive portions are provided to be disposed at an equal angle interval in the inside surface direction of the lens barrel, the force which acts on the optical member as the adhesive cures becoming biased in plan view as seen from the optical axis direction is suppressed. Therefore, the movement of the optical member in relation to the lens barrel as the adhesive cures is suppressed.

In the liquid ejecting apparatus, it is preferable that a sealing member be further provided in a position contacting the optical member inside the lens barrel to close a gap between the optical member and an inner circumference surface of the optical member.

In this case, in the lens barrel, the gap between the optical member and the inner circumference surface of the optical member is closed by the sealing member. Therefore, a possibility that foreign material enter therein can be suppressed.

In the liquid ejecting apparatus, it is preferable that the sealing member be composed of an elastically deformable elastic member.

In this case, since the optical member and the inner circumference surface of the optical member can be tightly adhered by elastically deforming of the sealing member, a possibility that foreign materials enter therein can be suppressed.

A manufacturing method of an imaging unit which includes a cylindrical lens barrel, and an optical member which is disposed inside the lens barrel and is fixed to the lens barrel using an adhesive, in which the lens barrel includes a plurality of abutting portions which are orthogonal to a center axis of the lens barrel, and are formed at an interval in an inner surface direction, which is a direction along an inside surface of the lens barrel, in which the manufacturing method includes disposing in which the optical member is inserted into the lens barrel and the optical member is caused to abut the abutting portions in the optical axis direction of the optical member, adhering in which, in the lens barrel, an adhesive is injected between portions which face an outside surface of the optical member and which do not overlap the abutting portions in plan view as seen from the optical axis direction, and an outside surface of the optical member, and curing in which the adhesive is cured.

In this case, in the adhering, since the adhesive is injected at positions that do not overlap the abutting portions in plan view as seen from the optical axis direction, the adhesive does not easily enter the gaps between the abutting portions and the optical member in comparison to a case in which the adhesive is injected at positions which overlap the abutting portions in plan view as seen from the optical axis direction. Therefore, the adhesive curing due to the curing in a state in which the optical member lifts up in relation to the abutting portions and inclines in relation to the abutting portions due to the adhesive entering the gaps between the abutting portions and the optical member is suppressed.

In the manufacturing method of the imaging unit, it is preferable that the adhesive be a light curing adhesive, that, in the adhering, the adhesive be injected into a plurality of locations at an interval in the inside surface direction, and that, in the curing, the adhesive is cured by irradiating the plurality of locations into which the adhesive is injected with light at once.

When the adhesive cures, the force which pulls the optical member to the sides of the inside surface of the lens barrel due to the contraction of the adhesive as the adhesive cures acts on the optical member. Therefore, when the adhesive is cured by irradiating the adhesive of each location with light sequentially, the optical member moves toward the location of the adhesive that is first cured, and the optical member is fixed to the lens barrel in this state.

Therefore, in the method described above, the adhesive of all locations is cured at the same time by irradiating the plurality of locations of the adhesive with light at once. Accordingly, the forces which act on the optical member as the adhesive cures are generated at the same time. Therefore, the movement of the optical member in relation to the lens barrel in plan view as seen from the optical axis direction is suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, description will be given of an ink jet printer as a specific embodiment of the liquid ejecting apparatus, according to the drawings.

Figure 1:
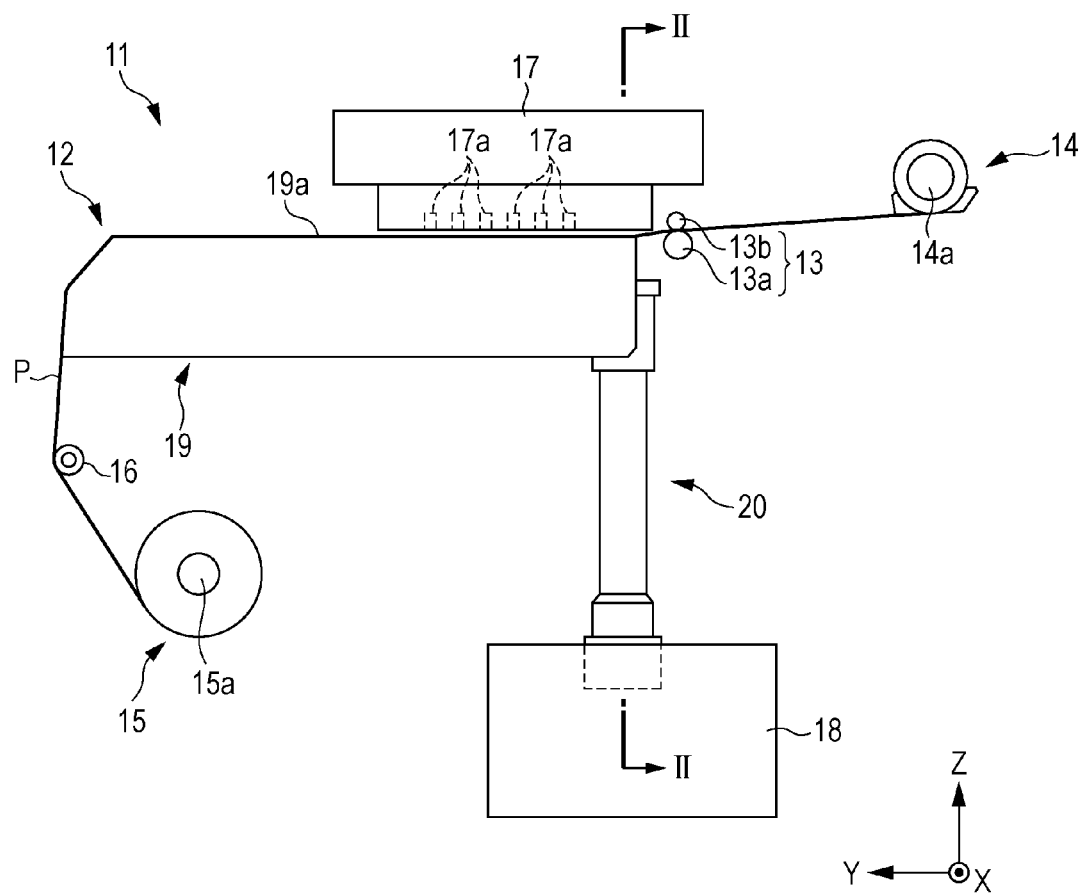
FIG. 1 is a schematic configuration diagram of an ink jet printer of an embodiment.

As illustrated in FIG. 1, the ink jet printer (hereinafter, "printer 11"), which is an example of the liquid ejecting apparatus, is provided with a transport apparatus 12, and an ejecting unit 17. The transport apparatus 12 transports a long sheet-shaped continuous paper P, which is an example of the medium, and the ejecting unit 17 performs printing by ejecting an ink onto the continuous paper P that is transported by the transport apparatus 12. The printer 11 is provided with a control unit 18 which controls the transport apparatus 12 and the ejecting unit 17.

The transport apparatus 12 is provided with a feed unit 14 and a winding unit 15. The feed unit 14 feeds the continuous paper P, and the winding unit 15 winds up the continuous paper P that is fed out from the feed unit 14 and printed on by the ejecting unit 17. In FIG. 1, while the feed unit 14 is disposed in a position on the right side, which is the upstream side in the transport direction Y (the left direction in FIG. 1) in relation to the continuous paper P, the winding unit 15 is disposed in a position on the left side, which is the downstream side.

The ejecting unit 17 is disposed to face the transport path of the continuous paper P in a position between the feed unit 14 and the winding unit 15. A plurality of nozzles 17a for ejecting the ink onto the continuous paper P are formed on the surface of the ejecting unit 17 that faces the transport path of the continuous paper P.

In the printer 11, a medium supporting portion 19 which supports the continuous paper P is disposed in a position facing the ejecting unit 17 to interpose the transport path of the continuous paper P. A surface of the medium supporting portion 19 that faces the ejecting unit 17 is a horizontal supporting surface 19a which supports the continuous paper P that is transported.

The imaging unit 20 for detecting the transportation amount of the continuous paper P in a non-contact manner is attached to the bottom portion of the medium supporting portion 19. The imaging unit 20 images the texture of the bottom surface (the non-print surface) of the paper and transmits the image to the control unit 18, which is attached to the bottom portion of the imaging unit 20. The control unit 18 controls the amount which the transport apparatus 12 transports the continuous paper P using a known method based on the image from the imaging unit 20.

A feed shaft 14a which extends in the width direction X (a direction orthogonal to the paper surface in FIG. 1) of the continuous paper P, which is a direction orthogonal to the transport direction Y of the continuous paper P, is provided in the feed unit 14 so as to be capable of rotational drive. The continuous paper P is supported by the feed shaft 14a to be capable of rotating integrally with the feed shaft 14a in a state of being wound in a roll shape in advance. The continuous paper P is fed out from the feed shaft 14a toward the downstream side of the transport path by the feed shaft 14a rotationally driving.

A feed roller pair 13 is disposed diagonally below and to the left of the feed shaft 14a. The feed roller pair 13 is an example of a transport unit which guides the continuous paper P that is transported from the feed shaft 14a to the supporting surface 19a while pinching the continuous paper P. The feed roller pair 13 is disposed in a position which is adjacent, in the transport direction Y, to the upstream side end portion in the transport direction Y of the medium supporting portion 19. The feed roller pair 13 includes a feed roller 13a and a paper retaining roller 13b. The feed roller 13a is provided to be capable of rotational driving, and the paper retaining roller 13b follows the rotation of the feed roller 13a.

A tension roller 16 for adjusting the tensile force of a region of the continuous paper P that is already printed is disposed on the downstream side in the transport direction Y of the supporting surface 19a in the transport path of the continuous paper P. The winding unit 15 is disposed on the downstream side of the tension roller 16 in the transport path of the continuous paper P.

The winding shaft 15a which extends in the width direction X of the continuous paper P is provided in the winding unit 15 to be capable of rotational driving. The continuous paper P, which is transported from the tension roller 16 side by the rotational driving of the winding shaft 15a already printed, is sequentially wound up by the winding shaft 15a.

Next, description will be given of the detailed configuration of the imaging unit 20 using FIG. 2.

Figure 2:
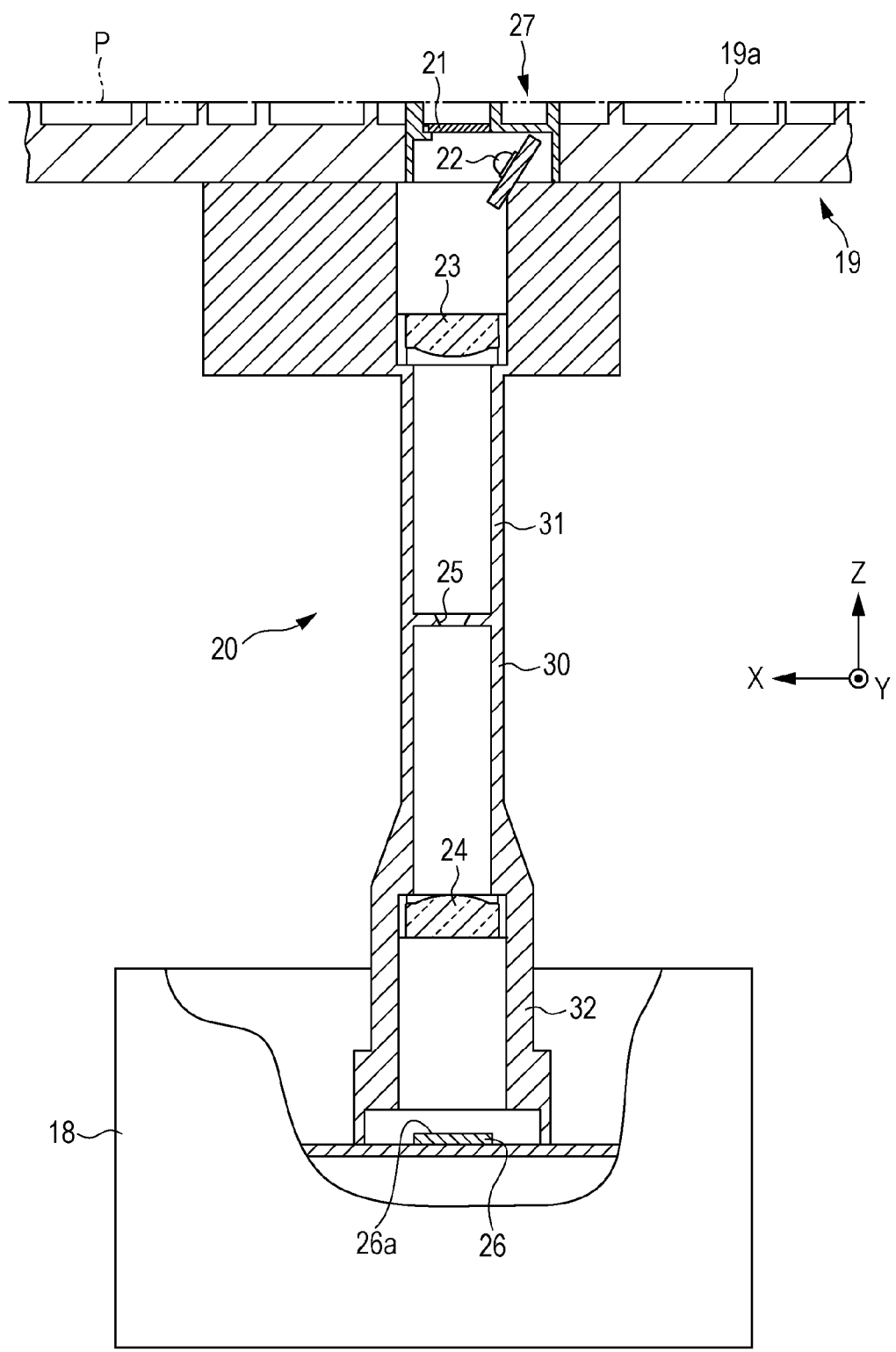
FIG. 2 is a cross sectional diagram taken along the line II-II of FIG. 1.

As illustrated in FIG. 2, the imaging unit 20 is provided with a cylindrical lens barrel 30 that extends in the vertical direction Z. The top end portion of the lens barrel 30 is fixed to the medium supporting portion 19 using screws (not shown), and the bottom end portion of the lens barrel 30 is fixed to the control unit 18, which has a housing, using screws (not shown).

A lens barrel cover 27 is attached to the top end portion of the lens barrel 30 so as to cover the lens barrel 30 from the top side. A colorless transparent light transmitting member 21 which permits the transmission of light is fixed to the lens barrel cover 27.

A light radiation unit 22 which radiates light onto the bottom surface of the continuous paper P is disposed in the space which is formed by the top end portion of the lens barrel 30 and the lens barrel cover 27. The light radiation unit 22 is a light source such as a light-emitting diode or a halogen lamp, and, in the present embodiment, is configured by a light-emitting diode (LED). The light radiation unit 22 radiates light toward the continuous paper P from the bottom surface side of the continuous paper P which is transported over the supporting surface 19a, through the light transmitting member 21. In this case, the light radiation unit 22 is disposed such that the light from the width direction X side obliquely radiates the bottom surface of the continuous paper P.

Enlarged diameter portions 32 are formed at both end portions in the vertical direction Z of a cylindrical portion 31 of the lens barrel 30. The enlarged diameter portions 32 have larger inner diameters than the inner diameter of the center portion of the cylindrical portion 31 in the vertical direction Z. An object-side lens 23, which is an example of the optical member, is housed in the enlarged diameter portion 32 of the top end side of the cylindrical portion 31, and an image side lens 24, which is an example of the optical member, is housed in the enlarged diameter portion 32 of the bottom end side of the cylindrical portion 31. An aperture 25, which is positioned between the object-side lens 23 and the image side lens 24, is formed in the cylindrical portion 31 of the lens barrel 30.

The object-side lens 23 is, for example, a telecentric lens, and focuses the light which is emitted from the light radiation unit 22 passes through the light transmitting member 21, is reflected by the bottom surface of the continuous paper P, subsequently passes through the light transmitting member 21 again, is reflected and enters the inside of the cylindrical portion 31 of the lens barrel 30. The range of the light is narrowed by the light that passes through the object-side lens 23 passing through the aperture 25. The image side lens 24 is, for example, a telecentric lens, and focuses the light that passes through the aperture 25.

An imaging device 26 is disposed on the bottom end portion of the enlarged diameter portion 32 that is housed in the control unit 18. The imaging device 26 includes an imaging surface 26a on which an image of the bottom surface of the continuous paper P, which is focused on by the image side lens 24, is formed. The imaging device 26 is formed of a two-dimensional image sensor, for example. The image that is imaged by the imaging unit 20 is output to the control unit 18.

Next, description will be given of the fixing structures between the lens barrel 30, and the object-side lens 23 and the image side lens 24, using FIGS. 3 to 6. Since the fixing structures are the same for the object-side lens 23 and the image side lens 24, description will be given hereinafter of the fixing structure between the object-side lens 23 and the lens barrel 30 to represent both.

Figure 3:
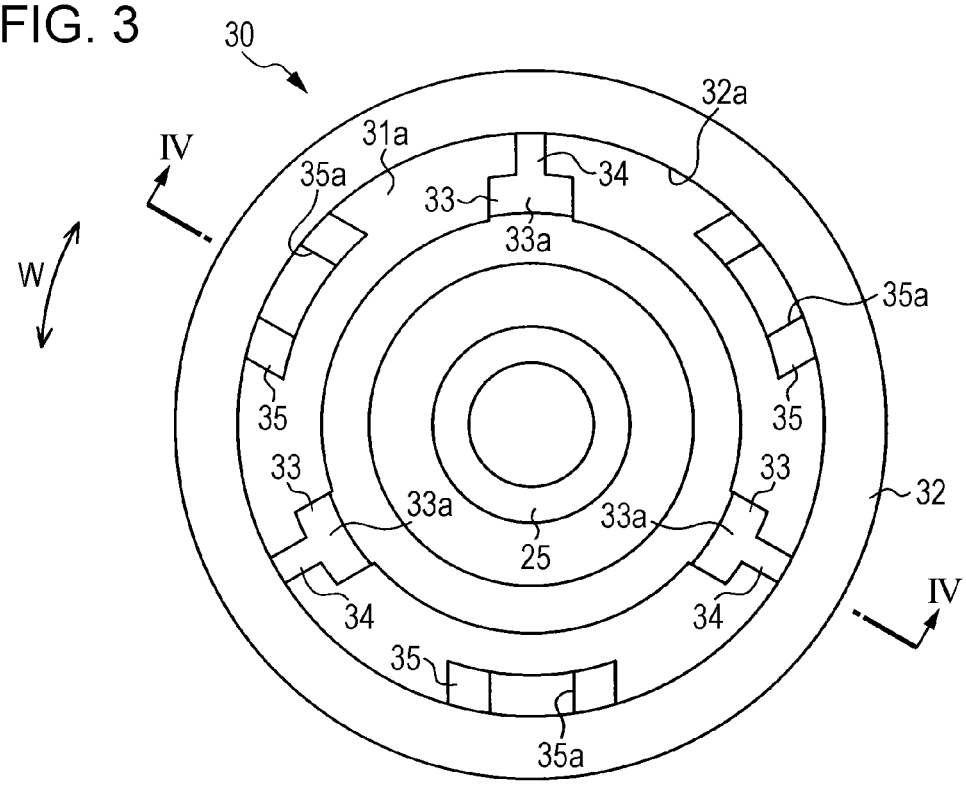
FIG. 3 is a plan view of a lens barrel.
Figure 4:
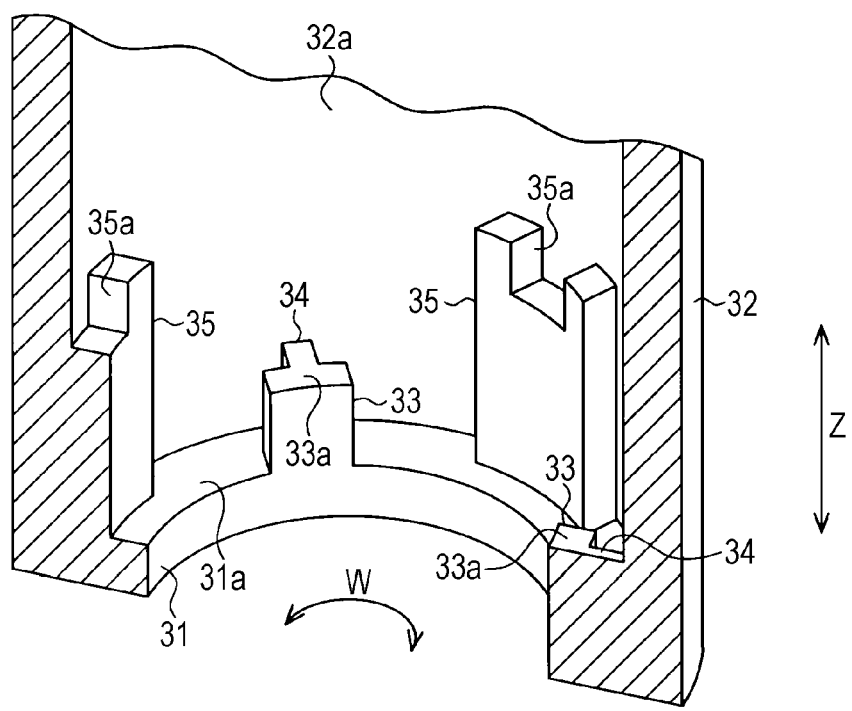
FIG. 4 is a cross sectional perspective diagram taken along the line IV-IV of FIG. 3.

As illustrated in FIG. 3, three abutting portions 33 are formed in the enlarged diameter portion 32 of the lens barrel 30, and the object-side lens 23 (refer to FIG. 5) abuts the three abutting portions 33 in the vertical direction Z. The three abutting portions 33 are formed so as to be disposed at an equal angle interval of 120° in the circumferential direction W around the optical axis (the dot-and-dash line of FIG. 2) of the object-side lens 23 which is matched to the center axis of the lens barrel 30. The abutting portions 33 are formed to be arc shaped in plan view as seen from the optical axis direction (parallel to the vertical direction Z in the present embodiment) along the optical axis. A connecting portion 34 which connects the abutting portion 33 to an inner circumferential surface 32a of the enlarged diameter portion 32 is formed in the center portion of the abutting portion 33 in the circumferential direction W. As illustrated in FIG. 4, the abutting portion 33 and the connecting portion 34 extend upward from the top end surface 31a of the cylindrical portion 31. Note that, the disposition of the 120° equal angle interval of the three abutting portions 33 in the circumferential direction W includes a case in which the angles of the abutting portions 33 that are adjacent in the circumferential direction W are disposed slightly shifted from 120° due to machining error of the lens barrel 30.

As illustrated in FIG. 3, three protruding portions 35 are formed in the enlarged diameter portion 32 of the lens barrel 30 in different positions from the three abutting portions 33 in the circumferential direction W. In other words, each of the protruding portions 35 is formed in a position that does not overlap each of the abutting portions 33 in plan view as seen from the optical axis direction. The three protruding portions 35 are formed so as to be disposed at an equal angle interval of 120° in the circumferential direction W. The protruding portions 35 are disposed in the center portion between the abutting portions 33 that are adjacent to each other in the circumferential direction W. Note that, the disposition of the 120° equal angle interval of the three protruding portions 35 in the circumferential direction W includes a case in which the angles of the protruding portions 35 that are adjacent in the circumferential direction W are disposed slightly shifted from 120° due to machining error of the lens barrel 30.

As illustrated in FIG. 4, the protruding portion 35 protrudes inward from the inner circumferential surface 32a of the enlarged diameter portion 32, and protrudes upward from the top end surface 31a of the cylindrical portion 31. The protruding portion 35 is positioned closer to the outside than the inner circumferential edge of the top end surface 31a of cylindrical portion 31. A concave portion 35a, which is open to the top and the inside, is formed in the top portion of the protruding portion 35. The concave portion 35a is positioned higher than the abutting portion 33.

Figure 5:
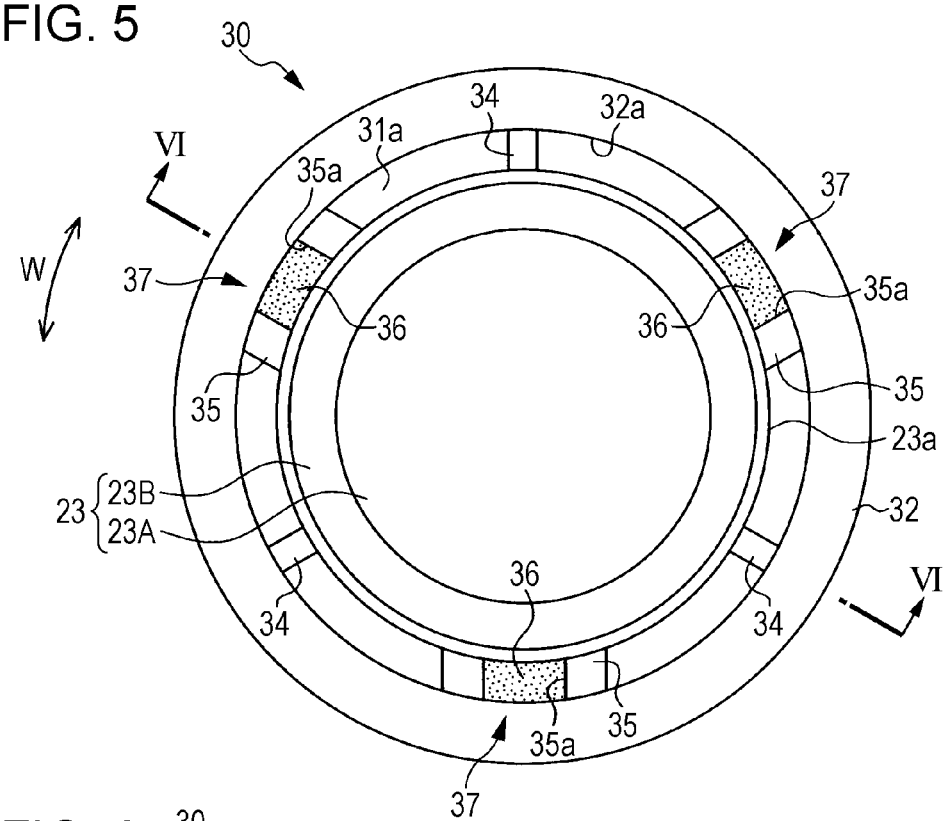
FIG. 5 is a plan view of a state in which an object-side lens is embedded in the lens barrel of FIG. 3.

As illustrated in FIG. 5, the object-side lens 23 includes a lens main body 23A for focusing light, and a cylindrical lens holder 23B which holds the lens main body 23A. The lens main body 23A is formed in a convex shape which protrudes downward toward the center portion (refer to FIG. 6). The lens holder 23B covers the outer circumferential portion of the object-side lens 23. The bottom surface of the lens holder 23B forms a surface that is parallel to the planar direction that is orthogonal to the optical axis direction, and forms a bottom surface 23b (refer to FIG. 6) of the object-side lens 23.

Figure 6:
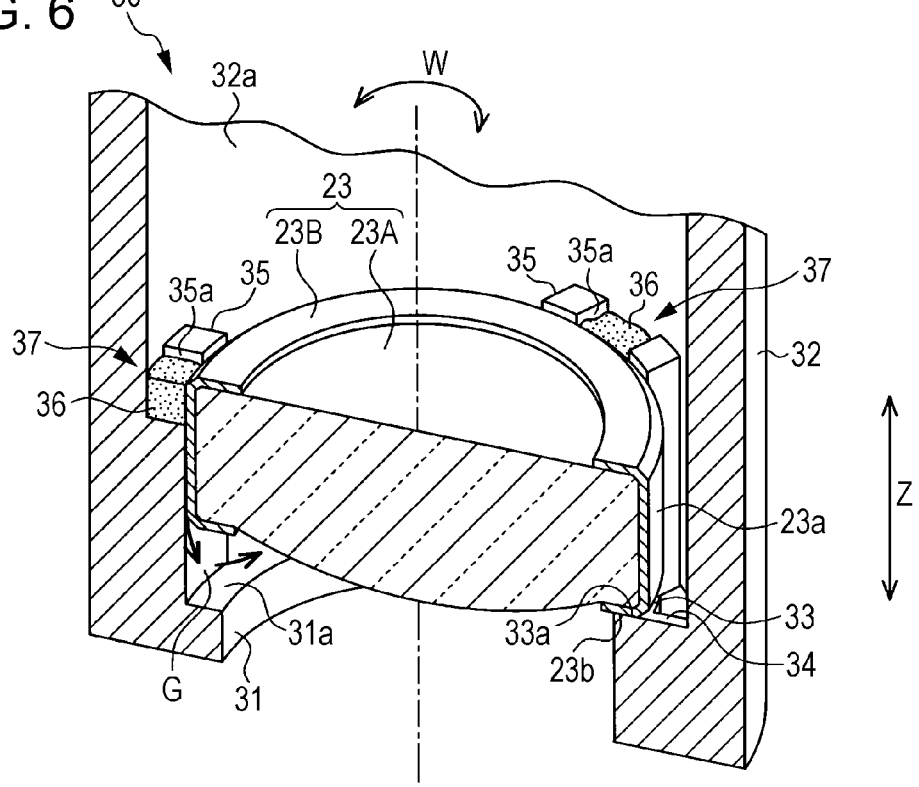
FIG. 6 is a cross sectional perspective diagram taken along the line VI-VI of FIG. 5.

The object-side lens 23 (the lens holder 23B) is in contact with the top surface 33a (refer to FIG. 3) of the three abutting portions 33 in a state of being fitted (hereinafter, also referred to as "fit loosely") on the three protruding portions 35 with a small gap. In this state, as illustrated in FIG. 6, the top end portions of the protruding portions 35 protrude further upward than the object-side lens 23. The concave portions 35a face the top portions of the outer circumferential surface 23a (the outer circumferential surface of the lens holder 23B) of the object-side lens 23. An adhesive 36 is injected between each of the concave portions 35a and the outer circumferential surface 23a of the object-side lens 23. Therefore, the object-side lens 23 is adhesively fixed to the lens barrel 30. In this manner, the concave portions 35a of the protruding portions 35, the outer circumferential surface 23a of the object-side lens 23, and the adhesive 36 form an "adhesive portion 37". Therefore, the adhesive portion 37 is provided to be disposed at an equal angle interval of 120° in the circumferential direction W. Note that, the disposition of the 120° equal angle interval of the adhesive portions 37 in the circumferential direction W includes a case in which the adhesive 36 is injected between each of the concave portions 35a of each of the protruding portions 35 and the outer circumferential surface 23a of the object-side lens 23 in regard to the angles of the protruding portions 35 that are adjacent in the circumferential direction W being disposed slightly shifted from 120° due to machining error of the lens barrel 30.

As illustrated in FIG. 6, the object-side lens 23 is positioned further inward than the protruding portions 35, and is positioned higher than the top end surface 31a of the cylindrical portion 31 than the abutting portions 33. Therefore, air gaps G are formed in the same positions in the circumferential direction W as the protruding portions 35, between the bottom surface 23b of the object-side lens 23 and the top end surface 31a of the cylindrical portion 31 in the vertical direction Z. The air gaps G communicate between the protruding portions 35 and the abutting portions 33 which are adjacent in the circumferential direction W.

Figure 7:
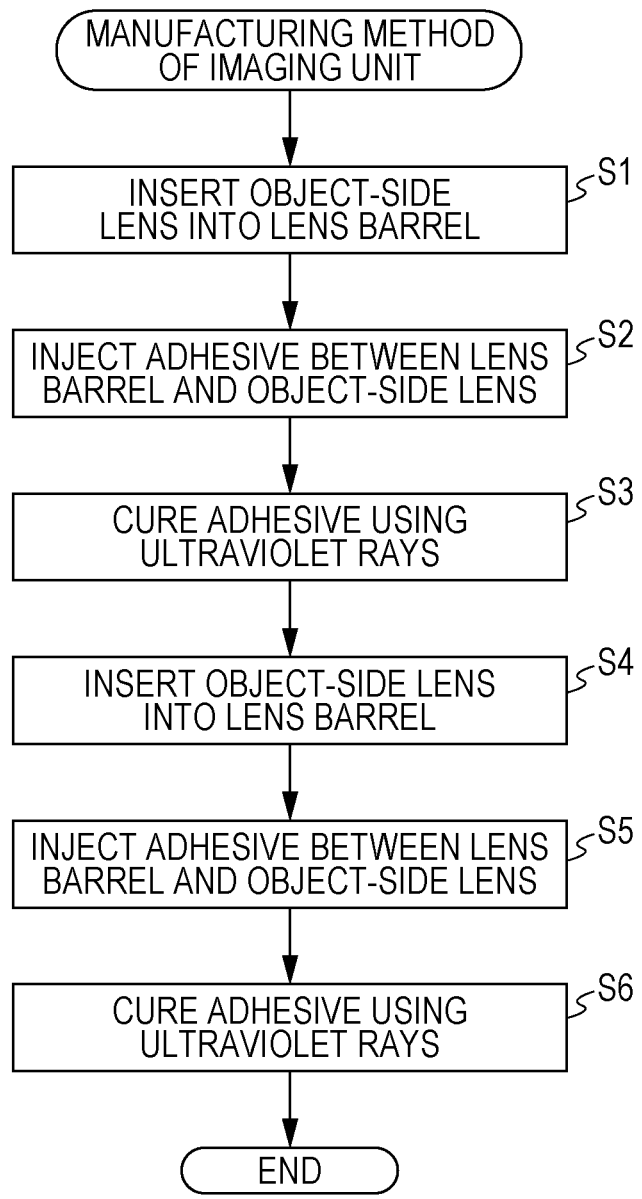
FIG. 7 is a flowchart illustrating a manufacturing process of an imaging unit.

Next, the description will be given of the manufacturing method of the imaging unit 20, in particular, of the method of embedding the object-side lens 23 and the image side lens 24 in the lens barrel 30, using FIG. 7. Note that, each component of the imaging unit 20 which is given a reference numeral in the following description indicates each of the components of the imaging unit 20 illustrated in FIGS. 3 to 6.

The manufacturing method of the imaging unit 20 includes a first disposition step, a first adhesion step, a first curing step, a second disposition step, a second adhesion step, and a second curing step.

In the first disposition step (step S1), the object-side lens 23 is inserted into the enlarged diameter portion 32 of the top end side of the lens barrel 30. Specifically, in the vertical direction Z, the object-side lens 23 is loosely fitted on the three protruding portions 35 and abuts the three abutting portions 33.

In this step, the position of the object-side lens 23 in relation to the lens barrel 30 in the vertical direction Z and the position of the object-side lens 23 in relation to the lens barrel 30 in plan view are determined.

In the first adhesion step (step S2), after the first disposition step, the adhesive 36 is injected between the outer circumferential surface 23a of the object-side lens 23 and the concave portions 35a of the three protruding portions 35. Note that, an ultraviolet ray curing adhesive is used for the adhesive 36.

In the first curing step (step S3), after the first adhesion step, an assembly obtained by adhering the object-side lens 23 to the lens barrel 30 using the adhesive 36 is inserted into an ultraviolet ray radiator (not shown). The adhesive 36 that is injected between the outer circumferential surface 23a of the object-side lens 23 and each of the concave portions 35a is irradiated with ultraviolet rays at once. Accordingly, all of the adhesive 36 is cured at the same time.

In the second disposition step (step S4), the image side lens 24 (refer to FIG. 2) is inserted into the enlarged diameter portion 32 of the bottom end side of the lens barrel 30 in the same manner as the insertion of the object-side lens 23 to the enlarged diameter portion 32 of the top end side in the first disposition step. From this point onward, the second adhesion step (step S5) and the second curing step (step S6) are the same as the first adhesion step and the first curing step. Accordingly, the image side lens 24 is fixed to the enlarged diameter portion 32.

Subsequently, the light radiation unit 22 (refer to FIG. 2) is attached to a portion of the top end portion of the lens barrel 30. After the positioning of the imaging device 26 (refer to FIG. 2) and the optical axes of the lenses 23 and 24 is adjusted using the light radiation unit 22, the imaging device 26 is attached to the bottom end portion of the lens barrel 30.

Description will be given of the operations of the printer 11, using the comparative example illustrated in FIGS. 8 and 9. Hereinafter, description will be given of the operations of the fixing structure between the object-side lens 23 and the enlarged diameter portion 32 of the top end side of the lens barrel 30, and since the operations of the fixing structure between the image side lens 24 and the enlarged diameter portion 32 of the bottom end side of the lens barrel 30 is similar to the operations of the fixing structure between the object-side lens 23 and the enlarged diameter portion 32 of the top end side of the lens barrel 30, description thereof will be omitted.

First, description will be given of the comparative example illustrated in FIGS. 8 and 9.

Figure 8:
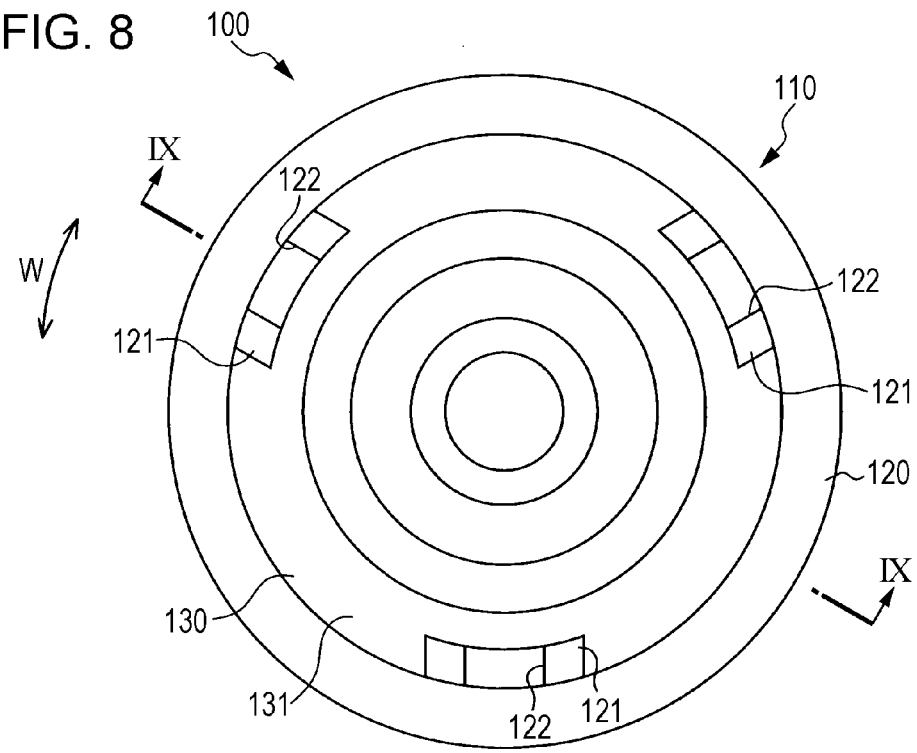
FIG. 8 is a plan view of a lens barrel of an imaging unit of a comparative example.

As illustrated in FIG. 8, three protruding portions 121 and a tubular abutting portion 130 are formed in an enlarged diameter portion 120 of a lens barrel 110 in an imaging unit 100 of the comparative example. The protruding portions 121 have the same dispositional configuration and shape as the protruding portions 35. In the enlarged diameter portions 120, the abutting portion 130 and the protruding portions 121 are in a mutually overlapping dispositional relationship in plan view. As illustrated in FIG. 9, an object-side lens 150 is loosely fitted on the three protruding portions 121, and abuts a top surface 131 of the abutting portion 130.

Figure 9:
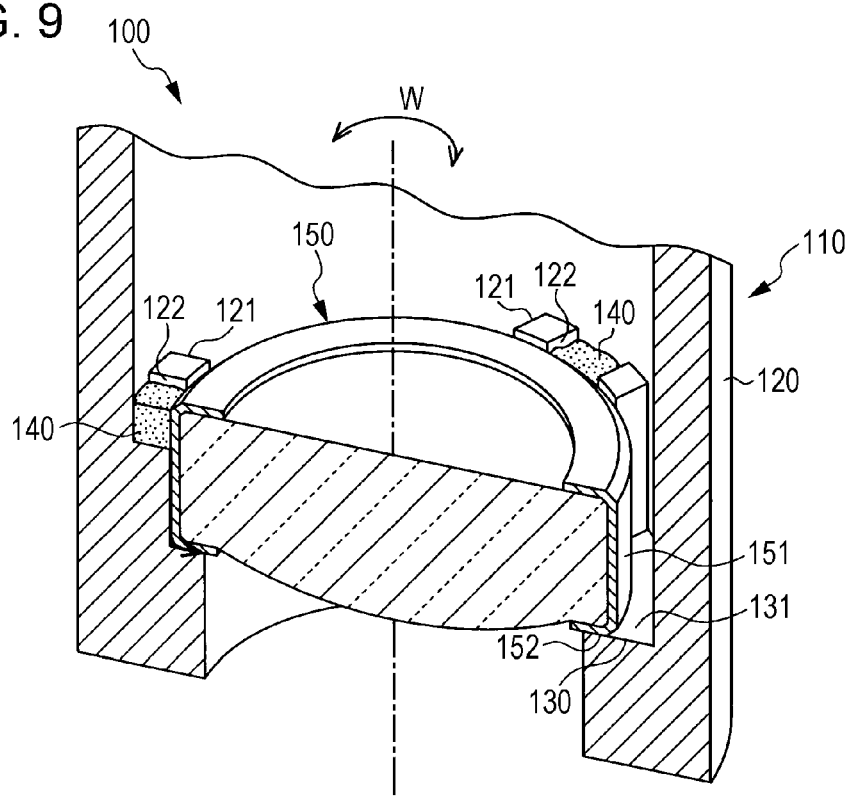
FIG. 9 is a cross sectional perspective diagram taken along the line IX-IX of FIG. 8 of a state in which an object-side lens is embedded in a lens barrel of a comparative example.

When an adhesive 140 is injected between an outer circumferential surface 151 of the object-side lens 150 and concave portions 122 of the protruding portions 121, since the adhesive 140 is yet to be cured, there is a case in which the adhesive 140 enters the gap between the inner circumferential surface of the protruding portions 121 and the outer circumferential surface 151 of the object-side lens 150, as illustrated by the thick-lined arrow in FIG. 9. There is a case in which the adhesive 140 enters the gap between the top surface 131 of the abutting portion 130 and the bottom surface 152 of the object-side lens 150. In such a case, there is a case in which the object-side lens 150 inclines in relation to the top surface 131 of the abutting portion 130 due to the adhesive 140 lifting the object-side lens 150 upward. When the object-side lens 150 inclines, since the optical axis of the object-side lens 150 inclines, there is a case in which it is not possible to clearly image the bottom surface of the continuous paper P (refer to FIG. 2).

Meanwhile, as illustrated in FIG. 3, in the imaging unit 20 of the present embodiment, the position of the abutting portions 33 differs from the position of the protruding portions 35. Accordingly, as illustrated in FIG. 6, even if the adhesive 36 that is injected between the concave portions 35a of the protruding portions 35 and the outer circumferential surface 23a of the object-side lens 23 enters the gap between the inner circumferential surface of the protruding portions 35 and the outer circumferential surface 23a of the object-side lens 23, the adhesive 36 is distanced from the top surfaces 33a of the abutting portions 33 in the circumferential direction W. Therefore, the entrance of the adhesive 36 to the gap between the top surfaces 33a of the abutting portions 33 and the bottom surface 23b of the object-side lens 23 is suppressed.

Since the abutting portions 33 are positioned higher than the top end surface 31a of the cylindrical portion 31, the air gaps G between the object-side lens 23 and the top end surface 31a of the cylindrical portion 31 are formed below the positions in the object-side lens 23 facing the protruding portions 35. Accordingly, as illustrated by the thick-lined arrows in FIG. 6, even if the adhesive 36 that is injected between the concave portions 35a of the protruding portions 35 and the outer circumferential surface 23a of the object-side lens 23 enters the gap between the inner circumferential surface of the protruding portions 35 and the outer circumferential surface 23a of the object-side lens 23, the adhesive 36 that enters flows into the air gaps G. The adhesive 36 that flows into the air gaps G flows into the air gaps between the protruding portions 35 and the abutting portions 33 in the circumferential direction W. In this manner, since the adhesive 36 that flows into the air gaps G is positioned lower than the top surfaces 33a of the abutting portions 33, the entrance of the adhesive 36 to the gap between the top surfaces 33a of the abutting portions 33 and the bottom surface 23b of the object-side lens 23 is further suppressed. Accordingly, the adhesive 36 causing the object-side lens 23 to incline in relation to the top surfaces 33a of the abutting portions 33 is suppressed.

According to the printer 11 of the present embodiment, it is possible to obtain the effects described hereinafter.

Hereinafter, description will be given of the effects of the fixing structure between the object-side lens 23 and the enlarged diameter portion 32 of the top end side of the lens barrel 30, and since it is possible to obtain the same effects of the fixing structure between the image side lens 24 and the enlarged diameter portion 32 of the bottom end side of the lens barrel 30 as the effects of the fixing structure between the object-side lens 23 and the enlarged diameter portion 32 of the top end side of the lens barrel 30, description thereof will be omitted.

(1) In the enlarged diameter portion 32 of the lens barrel 30, the three abutting portions 33 and the three adhesive portions 37 are disposed in different positioned in the circumferential direction W, that is, the three abutting portions 33 and the three adhesive portions 37 are disposed in positions that do not overlap each other in plan view as seen from the optical axis direction. Therefore, the object-side lens 23 inclining in relation to the top surfaces 33a of the abutting portions 33, caused by the entrance of the adhesive 36 to the gap between the top surfaces 33a of the abutting portions 33 and the bottom surface 23b of the object-side lens 23 is suppressed. Therefore, since the shifting of the focal point of the object-side lens 23 from the bottom surface of the continuous paper P due to the optical axis of the object-side lens 23 inclining is suppressed, the imaging unit 20 can clearly image the bottom surface of the continuous paper P.

(2) When the adhesive 36 that is injected into the three concave portions 35a, the force of the contraction of the adhesive 36 that accompanies the curing of the adhesive 36 acts on the object-side lens 23. Therefore, when it is assumed that the three adhesive portions 37 are disposed at different intervals in the circumferential direction W, there is a concern that the force which acts on the object-side lens 23 as the adhesive 36 contracts will be biased in plan view as seen from the optical axis direction. Therefore, there is a concern that the object-side lens 23 will move in relation to the lens barrel 30 as the adhesive 36 contracts.

To counter this, since the three adhesive portions 37 are provided to be disposed at an equal angle interval in the circumferential direction W, the force which acts on the object-side lens 23 as the adhesive 36 contracts becoming biased in plan view as seen from the optical axis direction is suppressed. Therefore, the object-side lens 23 moving in relation to the lens barrel 30 as the adhesive 36 contracts is suppressed.

(3) The position of the object-side lens 23 in relation to the lens barrel 30 (the enlarged diameter portion 32) in plan view as seen from the optical axis direction is determined by the object-side lens 23 being loosely fitted on the three protruding portions 35. Since the object-side lens 23 abuts the top surfaces 33a of the abutting portions 33 in this state, the position of the object-side lens 23 in relation to the lens barrel 30 in the vertical direction Z is determined. Therefore, it is possible to easily determine the position of the object-side lens 23 in relation to the lens barrel 30.

(4) The abutting portions 33 and the protruding portions 35 that are adjacent in the circumferential direction W are formed at an interval in the circumferential direction W. Therefore, even if the adhesive 36 that is injected between the concave portions 35a of the protruding portions 35 and the outer circumferential surface 23a of the object-side lens 23 enters the gap between the inner circumferential surface of the protruding portions 35 and the outer circumferential surface 23a of the object-side lens 23, the adhesive 36 that enters flows into the gaps between the abutting portions 33 and the protruding portions 35 in the circumferential direction W. Therefore, the entrance of the adhesive 36 to the gap between the top surfaces 33a of the abutting portions 33 and the bottom surface 23b of the object-side lens 23 is further suppressed.

(5) When the adhesive 36 cures, the force which pulls the object-side lens 23 to the sides of the inner circumferential surface of the protruding portions 35 due to the contraction of the adhesive 36 as the adhesive 36 cures acts on the object-side lens 23. Therefore, when it is assumed that the adhesives 36 of the concave portions 35a of the respective protruding portions 35 are sequentially irradiated with ultraviolet rays, and the adhesives 36 are sequentially cured, the object-side lens 23 moves toward the protruding portion 35 of the adhesive 36 that is cured first, and the object-side lens 23 is fixed to the lens barrel 30 in this state. Therefore, even if the adhesives 36 of the other protruding portions 35 are cured, the position of the object-side lens 23 in relation to the lens barrel 30 remains shifted.

Therefore, in the present embodiment, all of the adhesives 36 are cured at the same time by irradiating the adhesives 36 in the concave portions 35a of the three protruding portions 35 using ultraviolet rays at once. Accordingly, the forces acting on the object-side lens 23 as the adhesive 36 cures are generated at the same time in the adhesives 36 in all of the concave portions 35a. Therefore, the shifting of the position of the object-side lens 23 in relation to the lens barrel 30 is suppressed.

The embodiments described above may be modified to form different embodiments as described below.

Figure 10:
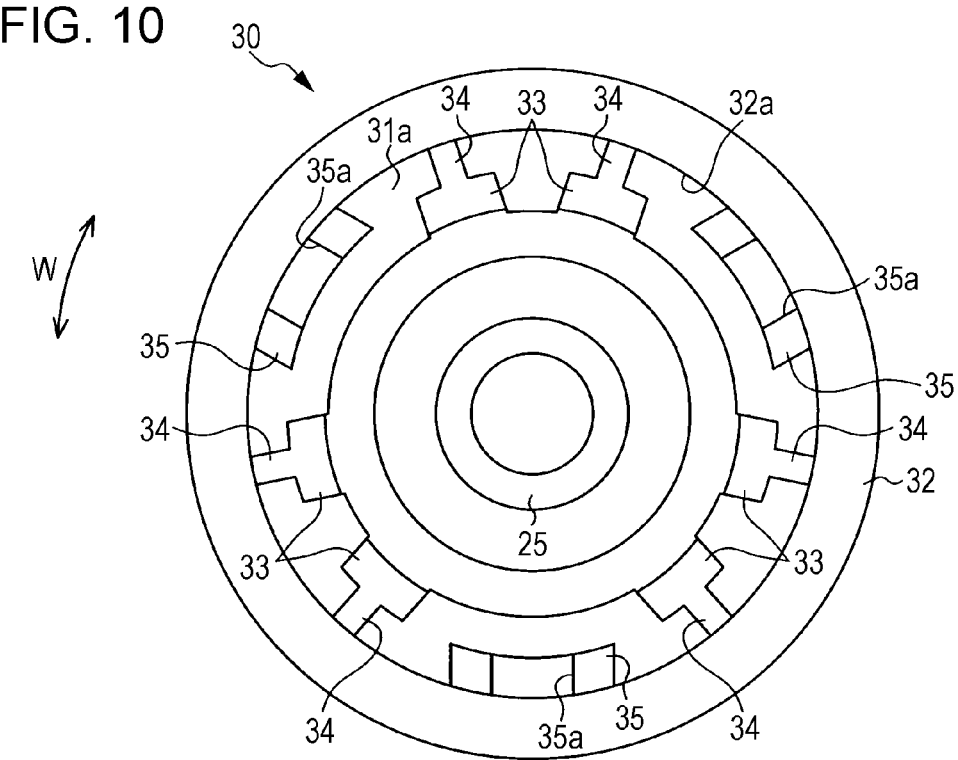
FIG. 10 is a plan view of a lens barrel of an imaging unit of a modification example.

In the embodiment described above, the number of abutting portions 33 that are formed between the protruding portions 35 which are adjacent in the circumferential direction W may be changed to two or more. For example, as illustrated in FIG. 10, the two abutting portions 33 are formed between the protruding portions 35 which are adjacent in the circumferential direction W in the enlarged diameter portion 32 of the lens barrel 30. The two abutting portions 33 are disposed at an interval in the circumferential direction W.

In the embodiment described above, the number of protruding portions 35 that are formed between the abutting portions 33 which are adjacent in the circumferential direction W may be changed to two or more. In this case, the number of the adhesive portions 37 that are formed between the abutting portions 33 which are adjacent in the circumferential direction W also becomes two or more.

Figure 11:
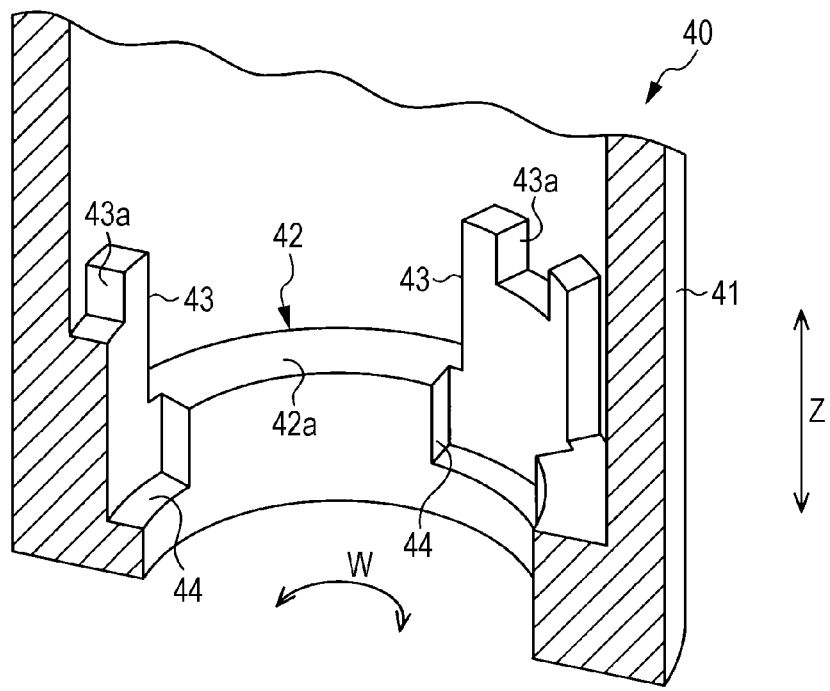
FIG. 11 is a cross sectional perspective diagram of a top end portion of the lens barrel of the imaging unit of the modification example.

In the present embodiment, a configuration of a lens barrel 40 illustrated in FIG. 11 may be adopted. In other words, a tubular abutting portion 42, and protruding portions 43 which extend inward from the inner circumferential surface of an enlarged diameter portion 41 and extend upward from top surface 42a of the abutting portion 42 are formed in an enlarged diameter portion 41 of the lens barrel 40. The concave portions 43a are formed in the top portions of the protruding portions 43. The object-side lens 23 (not shown in FIG. 11) abuts the top surface 42a of the abutting portion 42 in the vertical direction Z. Notch portions 44 are formed in portions of the abutting portion 42 corresponding to the protruding portions 43. The dimensions of the notch portions 44 in the circumferential direction W are greater than the dimensions of the protruding portions 43 in the circumferential direction W. In this case, even if the adhesive (not shown) in the concave portions 43a of the protruding portions 43 enters the gaps between the inner circumferential surfaces of the protruding portions 43 and the outer circumferential surface 23a (not shown in FIG. 11) of the object-side lens 23, the adhesive flows into the notch portions 44. Therefore, the adhesive entering the gap between the top surface 42a of the abutting portion 42 and the bottom surface 23b of the object-side lens 23 is suppressed. Note that, in the lens barrel 40, the enlarged diameter portion 41 into which the image side lens 24 is inserted may also adopt the same configuration.

Figure 12:
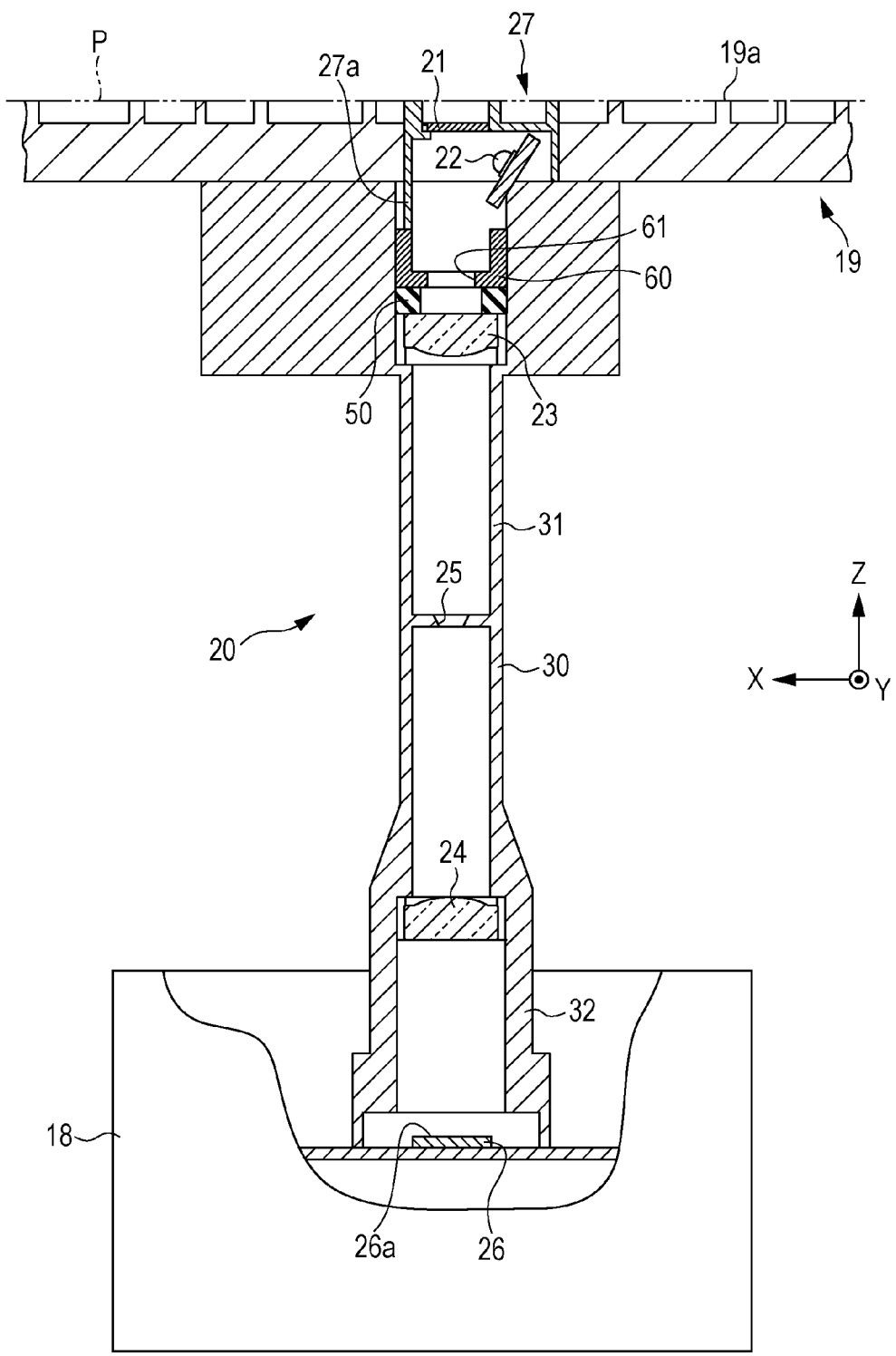
FIG. 12 is a cross sectional diagram schematically illustrating the imaging unit of the modification example.
Figure 13:
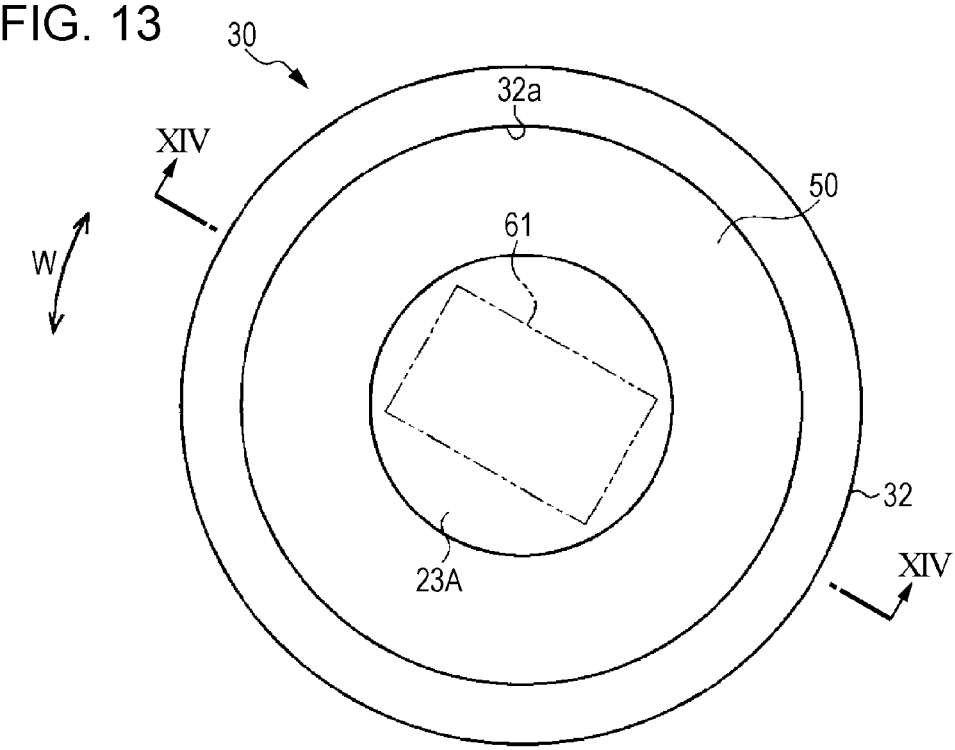
FIG. 13 is a plan view of the lens barrel of the modification example.
Figure 14:
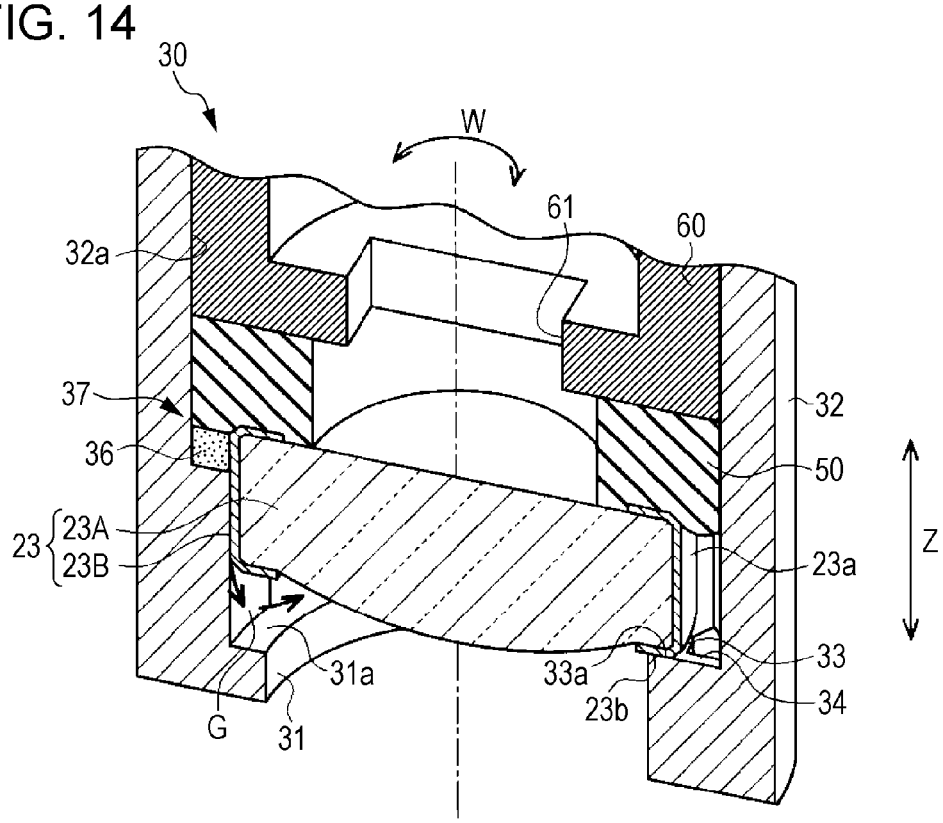
FIG. 14 is a cross sectional perspective diagram taken along the line XIV-XIV of FIG. 13.
Figure 15A:
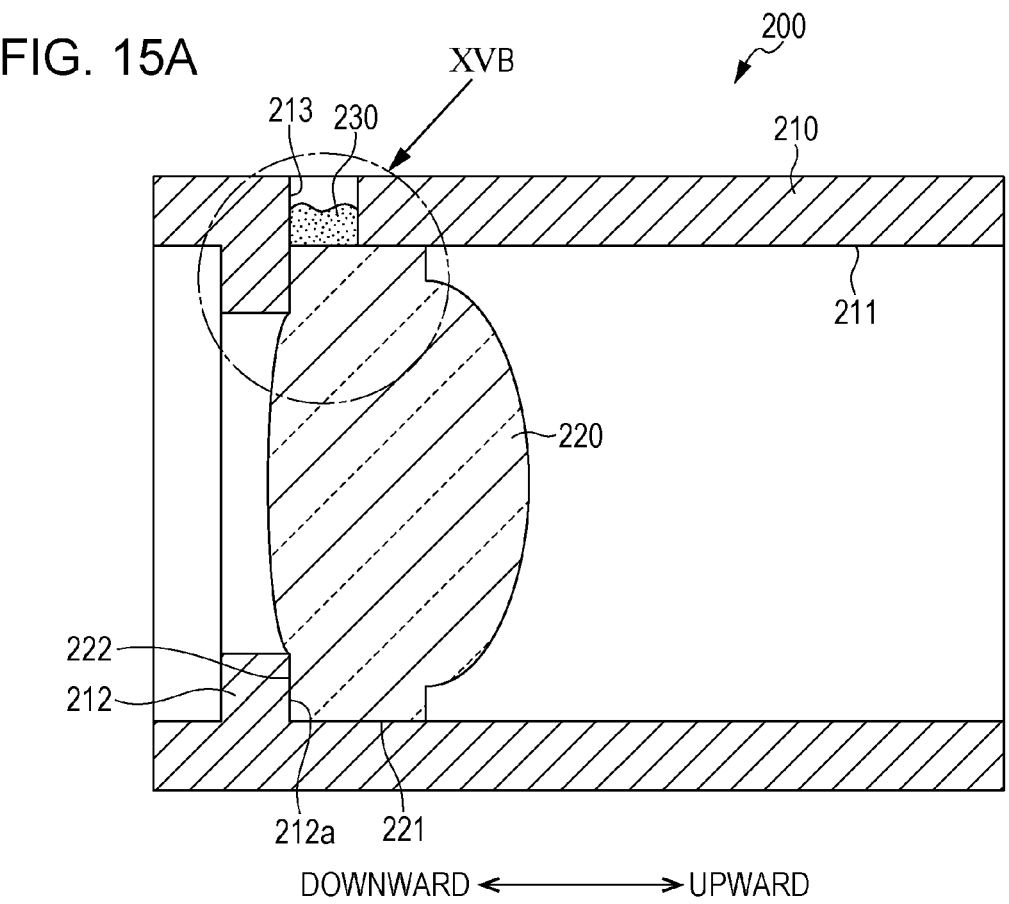
FIG. 15A is a cross sectional diagram of an imaging unit of the related art.
Figure 15B:
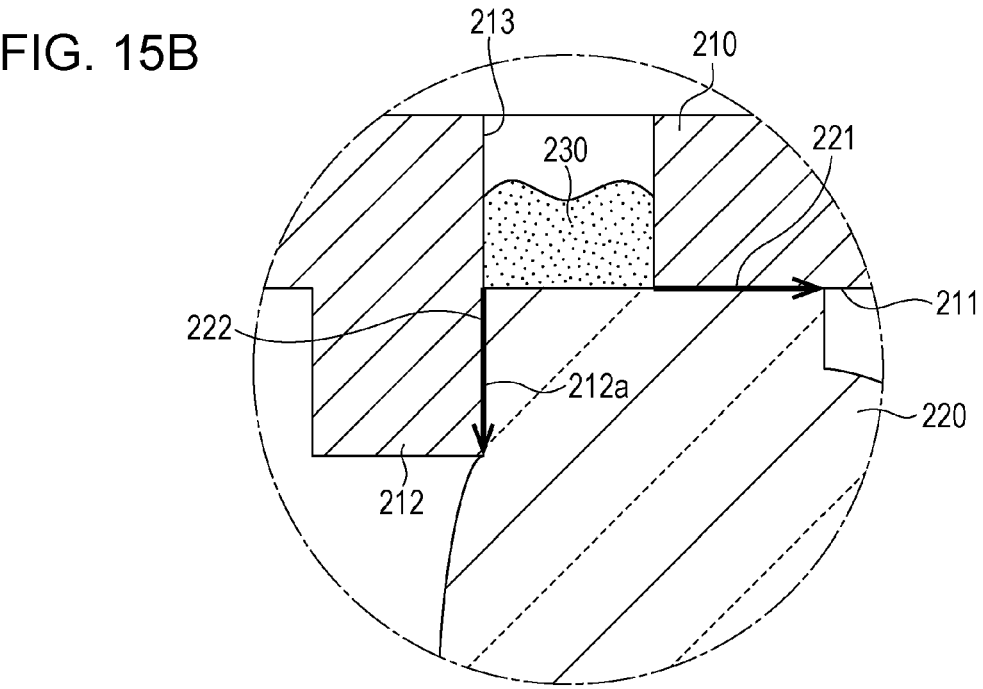
FIG. 15B is a diagram illustrating the circular dot-and-dash line of FIG. 15A in an enlarged manner.

In the embodiment described above, for example, as shown in FIGS. 12 to 14, a sealing member 50 for suppressing foreign materials from entering from the outside may be provided inside the lens barrel 30. In other words, the ring-shaped sealing member 50 which comes into contact with an upper surface that is an upper side of the object-side lens 23 housed inside the lens barrel 30 in the vertical direction Z and the inner circumference surface 32a of the enlarged diameter portion 32 may be provided inside the lens barrel 30. The ring-shaped sealing member 50 has an inner diameter which is a little smaller than the inner diameter of the lens holder 23B, and it overlaps with a portion of the lens main body 23A in plan view as seen from the upper side in the vertical direction Z. The sealing member 50 is composed of an elastically deformable elastic member such as rubber, and urethane, which has small repulsive force against external stress.

A polyurethane sponge with an excellent water-absorbing property or water-retaining property and further excellent abrasion resistance is preferable.

A light shielding member 60 which is formed of a black material for absorbing light is disposed in a position contacting the upper surface of the sealing member 50. The light shielding member 60 has a rectangular opening 61 centered about a central axis of the lens barrel 30. The reflective light reflected by the bottom surface of the continuous paper P passes through the opening 61, thereby narrowing the range of the light. In other words, the reflective light, in which the light emitted from the light radiation unit 22 passes through the light transmitting member 21, and is reflected by the bottom surface of the continuous paper P, passes through the opening 61 of the light shielding member 60, and is focused by the object-side lens 23.

A extension part 27a extending downward from the lens barrel cover 27 so as to enter the inside of the lens barrel 30 is connected to the light shielding member 60 from the upside in the vertical direction Z. Therefore, the light shielding member 60 is pressed downward. In other words, since the light shielding member 60 is pressed downward by the extension part 27a, the sealing member 50 is strongly interposed between the light shielding member 60 and the object-side lens 23 in the vertical direction Z. At this time, since the sealing member 50 is composed of an elastic member, and is strongly interposed therebetween, the sealing member 50 is elastically deformed so as to close a gap between the object-side lens 23 (lens holder 23B) and the inner circumference surface 32a of the enlarged diameter portion 32, and then, comes into contact with an upper surface of the object-side lens 23 and the inner circumference surface 32a of the enlarged diameter portion 32. Since the sealing member 50 comes into contact with the object-side lens 23 and the inner circumference surface 32a, the inside of the cylindrical portion 31 of the lens barrel 30 is sealed.

According to the configuration, a possibility that foreign materials such as paper powder or dust floating outside of the imaging unit 20, or ink mist ejected from the ejecting unit 17 enter inside of the cylindrical portion 31 of the lens barrel 30, and attach to the imaging device 26 can be suppressed. Therefore, it is possible to secure the accuracy of imaging in the imaging unit 20. The sealing member 50 may be disposed on the image side lens 24 side, and may be disposed on any side of the image side lens and the object-side lens. The light shielding member 60 or the extension part 27a is not an essential component, and a pressing unit for pressing the sealing member 50 toward the optical member (lens) side may be optionally provided inside the lens barrel 30.

In the embodiment described above, the concave portions 35a may be omitted from the protruding portions 35. In this case, the adhesive 36 is injected between the inner circumferential surface of the protruding portions 35 and the outer circumferential surface 23a of the object-side lens 23. The adhesive portions 37 are formed of the inner circumferential surfaces of the protruding portions 35 and the portions of the outer circumferential surface 23a of the object-side lens 23 facing the protruding portions 35, and of the adhesive 36.

In the embodiment described above, instead of the ultraviolet ray curing adhesive, another light curing adhesive may be used as the adhesive 36. Another adhesive such as an anaerobic adhesive may be used as the adhesive 36.

In the embodiment described above, the enlarged diameter portion 32 of the lens barrel 30 may include two of the abutting portions 33 and two of the protruding portions 35. In this case, the abutting portions 33 and the protruding portions 35 are formed so as to be at an equal angle interval of 180° in the circumferential direction W, and are disposed 90° shifted from each other in the circumferential direction W.

In the embodiment described above, the number of the enlarged diameter portions 32 of the lens barrel 30 and the number of the protruding portions 35 may each be three or more. The number of the enlarged diameter portions 32 and the number of the protruding portions 35 may be different from each other.

In the embodiment described above, the enlarged diameter portions 32 and the protruding portions 35 may not be formed to be disposed at an equal angle interval in the circumferential direction W.

In the embodiment described above, the protruding portions 35 may be omitted. In this case, the inner diameters of the enlarged diameter portions 32 may be contracted to a size at which the object-side lens 23 (the image side lens 24) can be loosely fitted therein. The adhesive portions 37 are formed by injecting the adhesive 36 between the outer circumferential surface 23a of the object-side lens 23 and the inner circumferential surface 32a of the enlarged diameter portion 32.

In the embodiment described above, the inner surface shape of the enlarged diameter portion 32 of the lens barrel 30 in plan view as seen from the optical axis direction may be a polygonal shape such as square or hexagonal. In this case, it is preferable to change the outer surface shape of the object-side lens 23 (the image side lens 24) in plan view as seen from the optical axis direction according to the inner surface shape of the enlarged diameter portions 32.

In the embodiment described above, after fixing the image side lens 24 to the enlarged diameter portion 32 of the bottom end side of the lens barrel 30 using the adhesive 36, the object-side lens 23 may be fixed to the enlarged diameter portion 32 of the top end side of the lens barrel 30 using the adhesive 36.

The liquid ejecting apparatus may be applied to a thermal jet printer, and may be applied to a solid ink jet printer.

The liquid ejecting apparatus may be applied to a serial printer, may be applied to a line printer, and may be applied to a page printer.

The liquid ejecting apparatus may be configured to omit the winding unit 15 and the tension roller 16.

The medium is not limited to continuous paper, and may be a single sheet, film made of resin, metal foil, metal film, a composite film of resin and metal (laminated film), a woven article, a non-woven fabric, a ceramic sheet, or the like.

The state of the liquid discharged as minute droplets from the ejecting unit 17 includes liquids of a droplet shape, a tear shape and liquid which forms a line-shaped tail. The liquid referred to herein may be a material which can be ejected from the ejecting unit 17. For example, the liquid may be a substance which is in a liquid phase state, and includes liquid bodies of high or low viscosity, and fluid bodies such as sol, aqueous gel, other inorganic solvents, organic solvents, solutions, and liquid resins. The liquid not only includes liquids as a state of a substance, but also includes solutions, disperses and mixtures in which particles formed from solids such as pigments are dissolved, dispersed or mixed into a solvent. When the liquid is an ink, the term "ink" includes general aqueous inks and solvent inks, in addition to various liquid compositions such as gel ink and hot melt ink.

The entire disclosure of Japanese Patent Application No.: 2014-067091, filed Mar. 27, 2014 and 2015-033232, filed Feb. 23, 2015 are expressly incorporated by reference herein.

What is claimed is:

1. An imaging unit, comprising:
   a cylindrical lens barrel; and
   an optical member which is disposed inside the lens barrel and is fixed to the lens barrel using an adhesive,
   wherein the lens barrel includes a plurality of abutting portions which are orthogonal to a center axis of the lens barrel, are formed at an interval in an inner surface direction, which is a direction along an inside surface of the lens barrel, and which the optical member abuts in an optical axis direction of the optical member,
   wherein a plurality of adhesive portions, into which the adhesive is injected, are provided between an outside surface of the optical member and an inside surface of the lens barrel facing the outside surface,
   wherein the plurality of adhesive portions are provided at an interval in the inside surface direction, and
   wherein the plurality of adhesive portions and the abutting portions are in a mutually non-overlapping dispositional relationship in plan view as seen from the optical axis direction.

2. The imaging unit according to claim 1,
   wherein the plurality of adhesive portions are provided so as to be disposed at an equal angle interval in the inside surface direction.

3. The imaging unit according to claim 1,
   wherein a plurality of protruding portions which protrude toward the outside surface of the optical member are formed on a portion in the inside surface of the lens barrel facing the outside surface of the optical member,
   wherein the plurality of protruding portions are formed at an interval in the inside surface direction,
   wherein the optical member is fitted on the plurality of protruding portions with a gap, and
   wherein the adhesive portions are formed by the adhesive being injected into gaps between the outside surface of the optical member and the protruding portions.

4. The imaging unit according to claim 1,
   wherein the adhesive portions which are adjacent to the abutting portions in the inside surface direction are provided at an interval in the inside surface direction from the same abutting portions.

5. The imaging unit according to claim 1, further comprising:
   a sealing member which is disposed in a position contacting the optical member inside the lens barrel to close a gap between the optical member and an inner circumferential surface of the lens barrel.

6. The imaging unit according to claim 5,
   wherein the sealing member is composed of an elastically deformable elastic member.

7. A liquid ejecting apparatus, comprising:
   a transport unit which transports a medium;
   an ejecting unit which ejects a liquid onto the medium;
   an imaging unit which images the medium that is transported by the transport unit; and
   a control unit which controls an amount which the transport unit transports the medium based on an image that is imaged by the imaging unit,
   wherein the imaging unit includes a cylindrical lens barrel, and an optical member which is disposed inside the lens barrel and is fixed to the lens barrel using an adhesive,
   wherein the lens barrel includes a plurality of abutting portions which are orthogonal to a center axis of the lens barrel, are formed at an interval in an inside surface direction, which is a direction along an inside surface of the lens barrel, and which the optical member abuts in an optical axis direction of the optical member,
   wherein a plurality of adhesive portions, into which the adhesive is injected, are provided between an outside surface of the optical member and an inside surface of the lens barrel facing the outside surface, wherein the plurality of adhesive portions are provided at an interval in the inside surface direction, and wherein the plurality of adhesive portions and the abutting portions are in a mutually non-overlapping dispositional relationship in plan view as seen from the optical axis direction.

8. The liquid ejecting apparatus according to claim 7, wherein the plurality of adhesive portions are provided to be disposed at an equal angle interval in the inside surface direction.

9. The liquid ejecting apparatus according to claim 7, further comprising:
   a sealing member which is disposed in a position contacting the optical member inside the lens barrel to close a gap between the optical member and an inner circumferential surface of the lens barrel.

10. The liquid ejecting apparatus according to claim 9, wherein the sealing member is composed of an elastically deformable elastic member.

11. A manufacturing method of an imaging unit which includes a cylindrical lens barrel, and an optical member which is disposed inside the lens barrel and is fixed to the lens barrel using an adhesive, wherein the lens barrel includes a plurality of abutting portions which are orthogonal to a center axis of the lens barrel, and are formed at an interval in an inner surface direction, which is a direction along an inside surface of the lens barrel, and wherein the manufacturing method comprises:

disposing in which the optical member is inserted into the lens barrel and the optical member is caused to abut the abutting portions in the optical axis direction of the optical member;

adhering in which, in the lens barrel, an adhesive is injected between portions which face an outside surface of the optical member and which do not overlap the abutting portions in plan view as seen from the optical axis direction, and an outside surface of the optical member; and curing in which the adhesive is cured.

12. The manufacturing method of the imaging unit according to claim 11,
   wherein the adhesive is a light curing adhesive,
   wherein, in the adhering, the adhesive is injected into a plurality of locations at an interval in the inside surface direction, and
   wherein, in the curing, the adhesive is cured by irradiating the plurality of locations into which the adhesive is injected with light at once.

* * * * *